US008650253B2

(12) United States Patent
Smedley et al.

(10) Patent No.: US 8,650,253 B2
(45) Date of Patent: Feb. 11, 2014

(54) SYSTEM AND METHOD FOR INTEGRATING ANCILLARY CONTENT INTO APPLICATIONS

(75) Inventors: John Charles Smedley, San Diego, CA (US); Don Neufeld, San Mateo, CA (US); Bruce Mitchener, Jr., San Diego, CA (US)

(73) Assignee: Sony Online Entertainment LLC, San Diego, CA (US)

( * ) Notice: Subject to any disclaimer, the term of this patent is extended or adjusted under 35 U.S.C. 154(b) by 971 days.

(21) Appl. No.: 12/367,265

(22) Filed: Feb. 6, 2009

(65) Prior Publication Data

US 2010/0041481 A1    Feb. 18, 2010

Related U.S. Application Data

(60) Provisional application No. 61/063,786, filed on Feb. 6, 2008.

(51) Int. Cl.
*G06F 15/16*    (2006.01)
(52) U.S. Cl.
USPC ........... 709/205; 709/203; 709/204; 709/217; 709/225; 463/11; 463/25; 463/42
(58) Field of Classification Search
USPC ............ 709/227, 203–205, 217, 226; 463/25, 463/29, 3, 11, 42
See application file for complete search history.

(56) References Cited

U.S. PATENT DOCUMENTS

| 6,077,161 A * | 6/2000 | Wisler ............................ 463/42 |
| 2003/0037149 A1 * | 2/2003 | Hess ............................. 709/227 |
| 2003/0073494 A1 * | 4/2003 | Kalpakian et al. .............. 463/42 |
| 2004/0097287 A1 * | 5/2004 | Postrel ............................ 463/41 |
| 2006/0121973 A1 * | 6/2006 | Parisien ......................... 463/25 |
| 2006/0172799 A1 | 8/2006 | Kane et al. |
| 2007/0060230 A1 | 3/2007 | Kang et al. |
| 2007/0094325 A1 * | 4/2007 | Ih et al. ......................... 709/203 |

(Continued)

OTHER PUBLICATIONS

Kimban, "AjaxLife—Second Life Through the Browser", Jul. 2007, website: metaverse.acidzen.org.*

(Continued)

*Primary Examiner* — Ramy Mohamed Osman
(74) *Attorney, Agent, or Firm* — Mark D. Wieczorek; Mayer & Williams PC (57) ABSTRACT

Systems and methods are provided to integrate, within a first application, a second application. In this way, multiple client systems, each running a first application, can access other players and mutually consume a second application. A lobby facility is provided to which client systems may access. First and second client systems may then be associated so that the same are configured to mutually consume a second application. The systems and methods also provide for cross-platform consumption of a second application by a plurality of client systems, each running respective first applications. The system includes a lobby facility module situated on a network-accessible server, the lobby facility module configured to allow communications between the network-accessible server and each of a first client system and a second client system. The system also includes a second application module, including a database module for storing information about the second application, first and second content translator modules enabling the second application module to provide and to receive content relevant to second applications running on the first and second client systems, and a rules module to determine an effect of content received from the first client system on content received from the second client system, and vice-versa.

33 Claims, 7 Drawing Sheets

(56) References Cited

U.S. PATENT DOCUMENTS

| | | | |
|---|---|---|---|
| 2007/0111794 A1* | 5/2007 | Hogan et al. | 463/42 |
| 2007/0117619 A1 | 5/2007 | Walker et al. | |
| 2007/0233291 A1* | 10/2007 | Herde et al. | 700/91 |
| 2008/0026847 A1* | 1/2008 | Mueller et al. | 463/42 |
| 2008/0146338 A1* | 6/2008 | Bernard et al. | 463/42 |
| 2008/0146341 A1* | 6/2008 | Hill et al. | 463/42 |
| 2009/0253516 A1* | 10/2009 | Hartmann et al. | 463/42 |
| 2010/0022308 A1* | 1/2010 | Hartmann et al. | 463/42 |

OTHER PUBLICATIONS

Thompson, Clive, "The Game Within the Game", May 2006, website: www.wired.com.*

* cited by examiner

SYSTEM AND METHOD FOR INTEGRATING ANCILLARY CONTENT INTO APPLICATIONS

CROSS-REFERENCE TO RELATED APPLICATIONS

This application claims the benefit of U.S. Provisional Patent Application Ser. No. 61/063,786 filed Feb. 6, 2008, entitled "Integrated Online and Offline Games", owned by the assignee of the present invention and herein incorporated by reference in its entirety.

BACKGROUND

Online computer sites, and other online multiuser applications, sometimes provide content ancillary to a main or primary type of content. For example, certain online social networking sites allow their users to play small or so-called "mini" games against each other. Users enjoy these games for a number of reasons, including that they provide an easy and convenient diversion from the main content. They also provide an additional way for users to interact with each other.

However, if a user is not associated with the site or multiuser application, then that user cannot enjoy the ancillary content along with those who are so associated. For example, if the user is not a member of a social networking site, then that user cannot play mini-games along with their friends who are members of the social networking site.

SUMMARY

Systems and methods are provided for integrating ancillary or "side" content into applications. In this way, e.g., the side content may be provided across applications, allowing mutual consumption by players of different applications. The applications across which consumption is provided are generally termed "first applications". The side content applications are generally termed "second applications".

The systems and methods are described in the context of an online trading card game (TCG) being played by multiple players, each player associated with a massive multiplayer online (MMO) game. In this case, the MMO is the first application and the TCG is the second application. In some cases, players of the same MMO, on the same or even on different servers, mutually playing a TCG, are also described. In other cases, a player may access the TCG through a separate online TCG client, or even through a client unrelated to the TCG. However, it should be clear that the systems and methods may be applied in other contexts as well. For example, as noted above, the content of the second application need not be a game. Other types of content, besides games, may also be enjoyed in a mutual manner between multiple users, including multimedia content, e.g., songs, movies, podcasts, videoclips, and the like. The first application need not be an MMO or TCG client; for example, the first application may be a social networking site. For brevity, however, examples of the first application described below will generally be MMOs and examples of the second application described below will generally be TCGs.

The systems and methods may involve a lobby facility whereby two or more users of different first applications may be matched to mutually consume a second application, such as a TCG. The different first applications may be different MMOs, different servers within a common MMO, an MMO and a TCG client, an MMO and a social networking site, a TCG client and a social networking site, or other combinations. In some cases, it should be noted, the same first application may also be used to consume the second application. It is also noted that the lobby facility may be minimal; if players are, e.g., already grouped, activating a TCG button may immediately begin TCG gameplay.

A particular implementation allows players to play a common TCG game across their different applications, using cards that may be played against each other but which include content pertaining to the respective player's MMO. That is, one player's MMO may have one corresponding set of TCG cards, and another player's MMO may have another corresponding set of TCG cards. Using the systems and methods described, the two TCG card sets may be played against each other. Alternatively, different but related MMOs may employ a common library of TCG cards from which players may obtain cards. In a further implementation, the TCG card sets may be unrelated but still playable against each other, regardless of the relation between the MMOs. Yet another implementation allows a player of an MMO to compete against a player of an online TCG, where the former accesses the lobby from within the MMO and the latter employs a separate online TCG client.

A player may access the lobby facility so as to communicate and challenge players of other MMOs or TCG clients. Once within the lobby facility, a player may communicate with others by a messaging system or chat system, e.g., a voice chat system, a universal chat system, or the like. The player may also challenge or become matched with other players for gameplay.

Other variations may include one or more of the following. The online TCG may be adjunct to an offline TCG played with physical cards, and such physical cards may include codes that, when entered in the MMO or TCG, provide special attributes or card enhancements, respectively. If played within the context of an MMO, the TCG may be an embedded client or may be a module with a common user interface as the MMO. MMO gameplay can provide cards, e.g., as dropped loot, quest rewards, or as the product of a trade or crafting skill. Online TCG cards may be directly playable in an MMO or may be translatable into MMO items, character enhancements, or the like, and vice-versa.

In one aspect, the invention is directed towards a computer-readable medium having instructions for causing a processor in an electronic device to perform a method of, for multiple client systems, each running a first application, to access other players and for mutual consumption of a second application. The method includes steps of providing a lobby facility to which client systems may access; receiving a login request from a first client system running a first application, and authorizing the first client system to access the lobby facility upon verification of a first credential; receiving a login request from a second client system running another first application, and authorizing the second client system to access the lobby facility upon verification of a second credential; and associating the first and second client systems, such that the first and second client systems are configured to mutually consume a second application.

Implementations of the invention may include one or more of the following. The associating may include receiving a request from the first or second client systems to become associated with the other. The first or second credential may be the same as a credential employed to access the first application. The associating may further include rendering the second application on a user interface of the first application using a rendering engine associated with the first application. A user interface for the second application may be the same as the user interface for the first application. The lobby facility may be accessible by activating an element within the first application. The lobby facility may be a separate web application launched upon activating the element. The second application may be audio content, video content, a video game, a podcast, or a combination. The lobby facility may include functionality for universal chat, and the universal chat functionality may be a communications mechanism for the second application.

The second application may be an online trading card game, in which each of the first and second users are associated with a respective plurality of cards and may hold a subset of the plurality of cards at a given time for gameplay, and each user's first application may be a multiplayer game client or an online trading card game client. In this case, one or more cards in the online trading card game may contain content relevant to a multiplayer game. Also in this case, the first application may be a first multiplayer game client; the another first application may be a second multiplayer game client, wherein the second multiplayer game is different from the first multiplayer game; and the first and second users are associated with, hold, and may play cards with content relevant to the first and second multiplayer games, respectively. The associating may further include translating the effects of cards played by the first user into comparable effects upon the cards of the second user, and vice-versa. The method may further include, during gameplay in the multiplayer game, earning cards from the gameplay. The gameplay may include performing crafting or trade skills, or retrieving dropped loot or quest rewards. The method may further include altering a user's player character's attribute in the multiplayer game according to a card owned or held by the user. The method may further include translating a card into an item in the multiplayer game, or vice-versa. The method may further include directly using a card in the multiplayer game. The method may further include creating a card based on a user's player character in the multiplayer game. The lobby facility may be a virtual location within the multiplayer game. The medium may further include instructions for causing a processor in an electronic device to perform a method of operating the online trading card game. The method of operating the online trading card game may further include a method of operating a game engine, a card storage facility, and a friends list. The online trading card game may be configured such that at least two players may play against each other, where the at least two players play on the same or different servers of a common multiplayer game.

In another aspect, the invention is directed towards a computer-readable medium having instructions for causing a processor in an electronic device to perform a method of operating a lobby facility. The lobby facility matches users, each associated with a client system running a first application, for mutual consumption of a second application. The method includes receiving a login request from a first client system running a first multiplayer game or a first trading card game client, and authorizing the first client to access a lobby facility upon verification of a first credential; receiving a login request from a second client system running a second multiplayer game or a second trading card game client, and authorizing the second client system to access the lobby facility upon verification of a second credential; and matching the first and second client systems such that at least the first and second client systems are configured to mutually play an online trading card game.

Implementations of the invention may include one or more of the following. The lobby facility may be launched from a lobby button within the first or second multiplayer games or trading card game clients, or may be launched from or run within a social networking site.

In yet another aspect, the invention is directed towards a system for cross-platform consumption of a second application by a plurality of client systems, each running respective first applications. The system includes a lobby facility module situated on a network-accessible server, the lobby facility module configured to allow communications between the network-accessible server and each of a first client system and a second client system, the first and second client systems running respective first applications. The system also includes a second application module, including: a database module for storing information about the second application; first and second content translator modules enabling the second application module to provide and to receive content relevant to second applications running on the first and second client systems; and a rules module to determine an effect of content received from the first client system on content received from the second client system, and vice-versa.

Implementations of the invention may include one or more of the following. The second application module may provide content relevant to the first or second client systems by employing a rendering engine within the first application associated with the first and second client systems, respectively. The first application may be a multiplayer game, an online trading card game client, a web application, or a social networking site application. The lobby facility module and the second application module may be situated on a common server.

Advantages of the systems and methods may include one or more of the following. The systems and methods allow players of different MMOs and/or TCGs to compete against other, across their respective applications or platforms. A lobby facility allows access and matching functionality to players from the different MMOs, and in some cases may also provide a venue for gameplay. The TCG can be played as one or more of an offline game, a computer game without a network connection, an online game with other players as an independent game, or an online game integrated into an online environment, such as an MMO or an online social/reality environment. The TCG software may be platform-agnostic and can be installed on different platforms, e.g., a handheld game device, a mobile phone, a PDA with wireless capability, a game console, or a notebook or desktop computer, and players using different platforms can interact and play with one another. Additional advantages will be apparent from the description that follows, including the figures and claims.

BRIEF DESCRIPTION OF THE DRAWINGS

FIG. 4 (A)-(B) illustrate various arrangements by which the second application, here an online TCG, may be integrated with respect to the first application, illustrated as an MMO, a TCG client, or another content client Z.

Like reference numerals refer to like components throughout the drawings.

DETAILED DESCRIPTION

As will be described, systems and methods are provided to implement an integrated system including a game that can be played in conjunction with a computer network environment, where the network may be as large as the internet or as small as a LAN or even just two networked computers. The game can also be played outside the network environment.

In one example, a TCG (or collectible card game, CCG) can be played using physical cards, offline, and with digital cards, online. In addition, the online TCG can be played in an online environment that is part of another online game, such as an MMO, e.g., an online role-playing game, or MMORPG, such as EverQuest™ offered by Sony Online Entertainment LLC. That is, the TCG may be integrated into an MMO.

Figure 1:
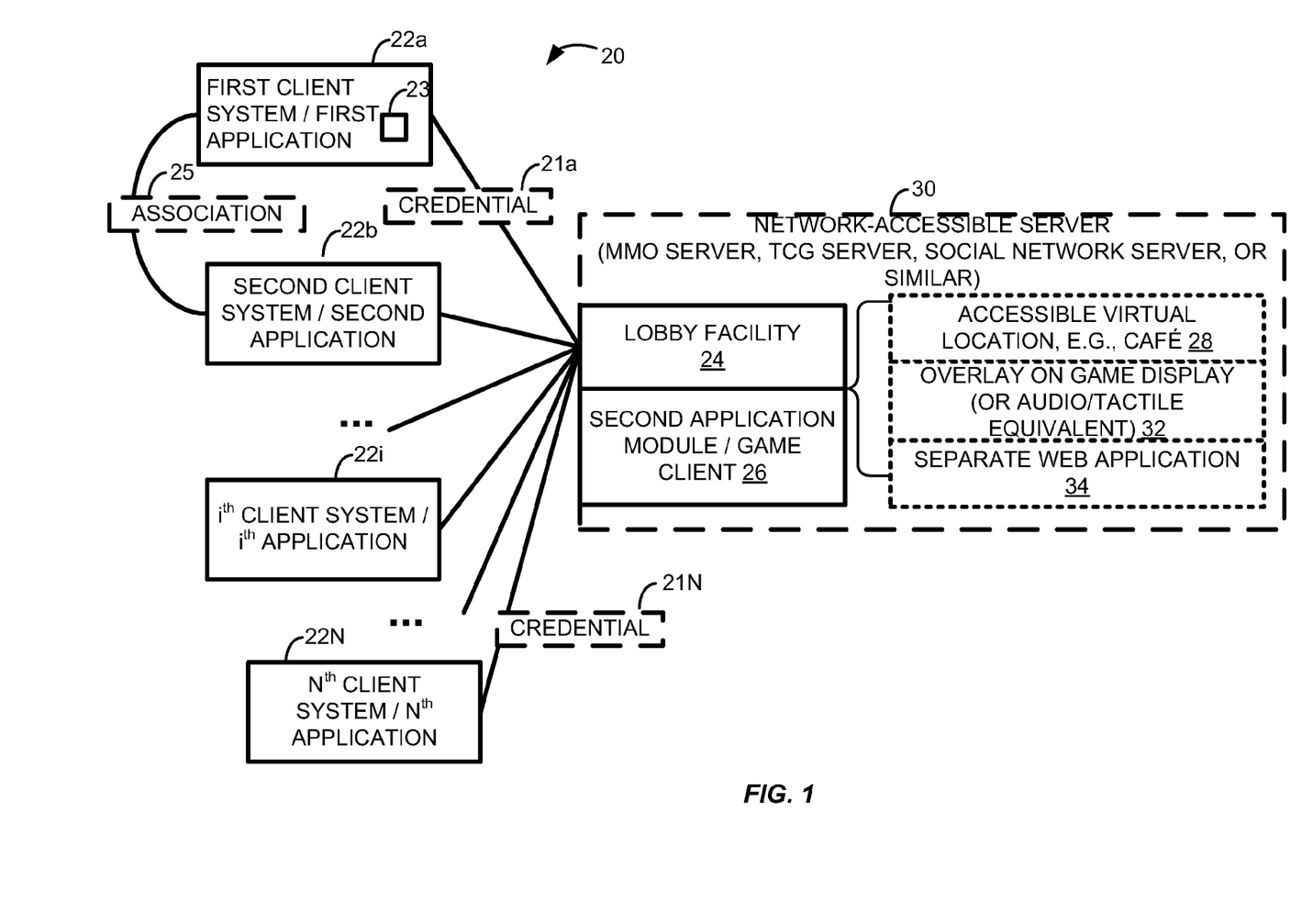
FIG. 1 illustrates a logical diagram of a system including multiple client systems, each running a first application through which, or along with which, a second application may be accessed and mutually consumed.

Referring to FIG. 1, a system 20 is illustrated including multiple client systems, each running a first application through which, or along with which, a second application may be accessed and mutually consumed. As noted above, the term "first application" may refer to an MMO, a separate TCG client application, a web application, or any other sort of application through which or along with which a second application may be accessed. The second application itself may be an online TCG, a multimedia file that is desired to be played back for two or more client systems and in this sense "mutually consumed" by users of the client systems, a song or video to be played back, a podcast or audio book, or any other sort of file which may be consumed. For a single multimedia file, the mutual consumption means that each client system renders the file and the users generally hear or see the same rendering. For an online TCG, or generally for other games as well, users will see and hear content that pertains or is relevant to them. For example, users may see the game from their point of view, with their cards, game pieces, or other game materials facing toward themselves. In this sense the content may not be identical but still relates to the same game.

The system 20 includes a number N of client systems 22*a*-22N, each connected via a network to a network-accessible server 30. While N client systems are illustrated, the system may be used with any number of client systems, e.g., two or more. The system may even be used with just one client system in cases where an optional computer opponent is provided, e.g., a "bot" component, as will be described below. The system may also be used with just one client system in cases where two players use the same client system.

Figure 2:
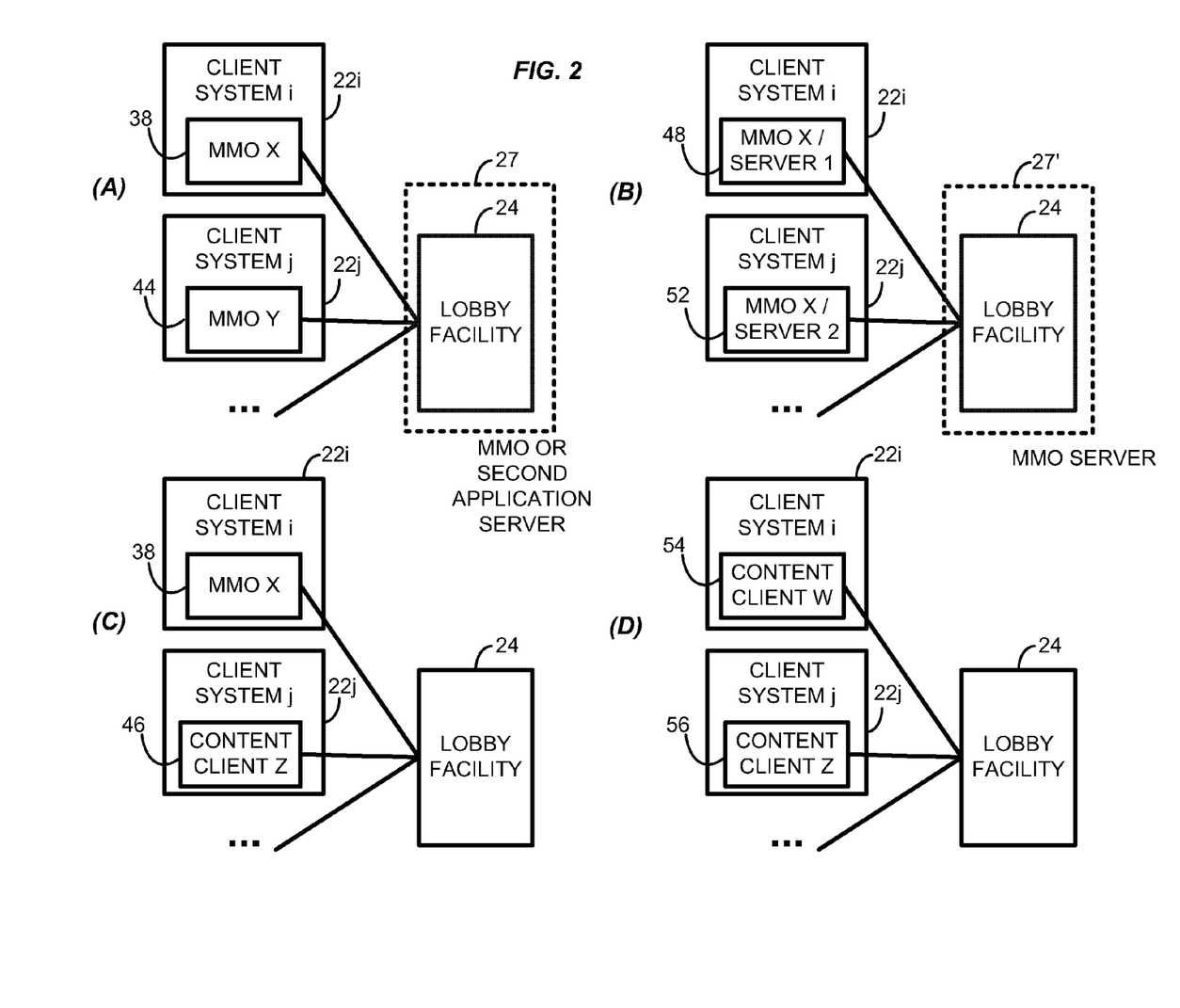
FIG. 2(A)-(D) illustrate various arrangements of client systems with a lobby facility, the client systems each running the first application.

Each client system 22*a*-22N runs a first application (see FIG. 2, elements 36 and 42). The first application may be, e.g., an MMO, a TCG client, a social networking application, or the like. In some cases, login credentials are required for the first application. Such login credentials are shown in FIG. 1 by credentials 21*a* (for client system 22*a*) and credentials 21N (for client system 22N).

The client systems 22*a*-22N access a common lobby facility 24 within the network accessible server 30. To access the lobby facility, a button 23 or other input mechanism may be disposed within the client system, e.g., within the first application or separate from the same, e.g., via a separate window or other separate user interface. In some implementations, the button 23 may allow immediate access to the lobby facility 24.

In certain other implementations, the button 23 may allow immediate access to the game, e.g., the TCG. For example, if player characters within the MMO are in some way grouped, either by a grouping functionality, by being associated via a friends list, or via any other such method, activating the button 23 may result in the grouped players immediately starting to play the TCG. In a related alternative implementation, activating the button 23 may result in a drop-down list appearing of various other potential players being displayed, e.g., from a group, guild, friends list, raid group, or the like. The player may then choose whom they would like to play against. The TCG or other game may then immediately begin.

In some cases, the lobby facility 24 requires a credentialing step, and either the same login credentials 21*i* may be used or a separate set of credentials entered. The lobby facility 24 may then be used to match two or more users together for the purpose of consuming the second application. The matching may be performed using any number of matching techniques, and the same may take into account the respective geographic location of the users, friends lists (including which friends are currently online), playing level, the second application each wishes to play, the first application each user is running, other user input, or any other type of criterion. As noted, three or more players may also be matched for play, and in some cases players may be grouped so as to play against other players or against other groups of players. For example, a team of two or more players may play against a single player or against another team. Once users are associated or matched, either as opponents or as a group, an "association" flag 25 may be set.

The system may provide for a number of venues for the lobby facility. For example, the venue may be a commonly-accessible location 28, e.g., a café, within an MMO game. The commonly-accessible location 28 may be especially suited for situations in which all players have as their first applications an MMO client, since in these situations each player will have a player character that can be moved into the location. For example, within different MMOs, a café may be situated that has a common appearance in each MMO. Upon entering the café, control of the player character's environment may be, at least in part, transferred from the first application to the second application, and in the cafe the player character can be matched with another player character.

In other cases, the lobby facility may be a virtual room that is entered as soon as authentication occurs, but is otherwise not associated with an MMO. In this case, character information may be obtained from public sources so that an appropriate player character is displayed; alternatively, a default player character may be shown, or no player character shown.

In simpler systems, the lobby facility may simply be a list of players, with certain details disclosed about each. By choosing a name or names on the list, a player may invite another player or players to play. Numerous other types of invitation systems will be understood to be capable of use.

Once matched, the second application, e.g., gameplay, may proceed. The network-accessible server 30 may provide a second application module 26, e.g., a game client, for such purposes. Alternatively, the second application module may be disposed on the same server that runs the server side of the first application—the client side of the first application is located on the client system.

A convenient type of way to present the gameplay is via an overlay 32; in this case, the gameplay is displayed on top of the MMO, online TCG client, or social networking site. The overlay 32 may be rendered by the same engine that renders the first application, although in some cases a separate renderer may be employed. Graphical (and/or audio) data may be transmitted from the network-accessible server 30 to a client system 22i along with instructions for the rendering engine to render the appropriate display.

Yet another type of venue is a separate web application 34 that may be launched upon activation of, e.g., the button 23. In this case, the web application 34 provides the second application, and the same may be situated on any network-accessible server. The web application 34 may be associated with the first application, or may be entirely separate.

In other implementations, the virtual café within the MMOs or the virtual room, not associated generally with MMOs, may be employed as a venue for gameplay. In these cases, the player characters may appear to be sitting or standing at tables, with the TCG cards placed on the tables. The vantage point displayed for a player may be that of the pertaining player character.

FIGS. 2(A)-(D) illustrate a number of ways in which the system may be arranged. In FIG. 2(A), two client systems 22i and 22j are shown in network communication with a lobby facility 24. Each client system 22i and 22j runs a first application. In particular, client system 22i runs a client side 38 of an MMO X and client system 22j runs a client side 44 of an MMO Y. Thus, each client system runs different MMOs.

In this implementation, the lobby facility 24 may be made a part of a separate second application server 27. For example, the second application server 27 may be the server side of one of the MMOs, e.g., MMO X. That is, while the client side 38 of the MMO X is situated on the client system 22i, a server side 27 of the MMO X may also be used to store the lobby facility module 24. Of course, in an alternative implementation, MMO Y may store the lobby facility. As another example, the lobby facility may be made a part of an online TCG server.

Once players are matched by the lobby facility, application control may be transferred to the second application module, which is described above with respect to FIG. 1 and in more detail below with respect to FIG. 3.

In one implementation of FIG. 2(A), players of different MMO's can play the TCG with one another through their MMO's. Ordinarily, MMO players only interact with players of the same MMO. In this example of the system, two players that both have the TCG software installed but are using different MMO software (e.g., EverQuest™ and EverQuest II™, offered by Sony Online Entertainment LLC) can play the TCG with one another while playing their respective MMO's. The players may have TCG cards that are different (but compatible) because each MMO may provide MMO-specific TCG cards to players. This capability of playing with cards having different content, but which may still be played against each other, is discussed in greater detail below.

FIG. 2(B) shows the situation where just one MMO X is involved, but where the client systems 22i and 22j play the MMO X on different servers, server 1 and server 2, respectively. However, in a related implementation, it should be noted that the system may also be employed where client systems 22i and 22j play on the same server. In FIG. 2(B), the client system 22i runs a first application 48 and the client system 22j runs a first application 52. In this arrangement, as in FIG. 2(A), MMO X may have a server side 27' which houses the lobby facility. Alternatively, the lobby facility may be a part of a separate TCG server, on which is also stored other functional components, as described below with regard to FIG. 3.

In one exemplary implementation of the system of FIG. 2(B), the second application is an online TCG game and the first application is a given MMO. The first player and the second player each have computer systems with client software for the TCG and MMO installed. The MMO has its own server and applicable software and the same operates on one or multiple server systems. The first player's client system is connected to and plays the MMO on a first MMO server and the second player's computer system is connected to and plays the MMO on a second MMO server. Ordinarily, players playing the MMO on different MMO servers do not interact, i.e., each server system supports a respective instance of the online environment or world that is part of the MMO game. However, in this implementation of the system and method, the two players can interact through the TCG, at least to play the TCG. Additional functionality may be provided, so as to allow chat or other types of features to be provided.

In FIG. 2(C), MMO X from FIG. 2(A) is replaced by content client Z (element 46). The content client 46 may be a client that specifically pertains to the second application, or may be any other type of client. For example, the content client 46 may be an online TCG client through which the client system 22j may access the lobby facility, be matched with one or more other players, and play the TCG. As above, the lobby facility may be stored on the same server as the MMO X or on the same server as the content client Z.

In FIG. 2(D), the two client systems 22i and 22j each have corresponding content clients W and Z (elements 54 and 56), respectively. In this way, the TCG may be played or consumed apart from MMO usage.

Figure 3:
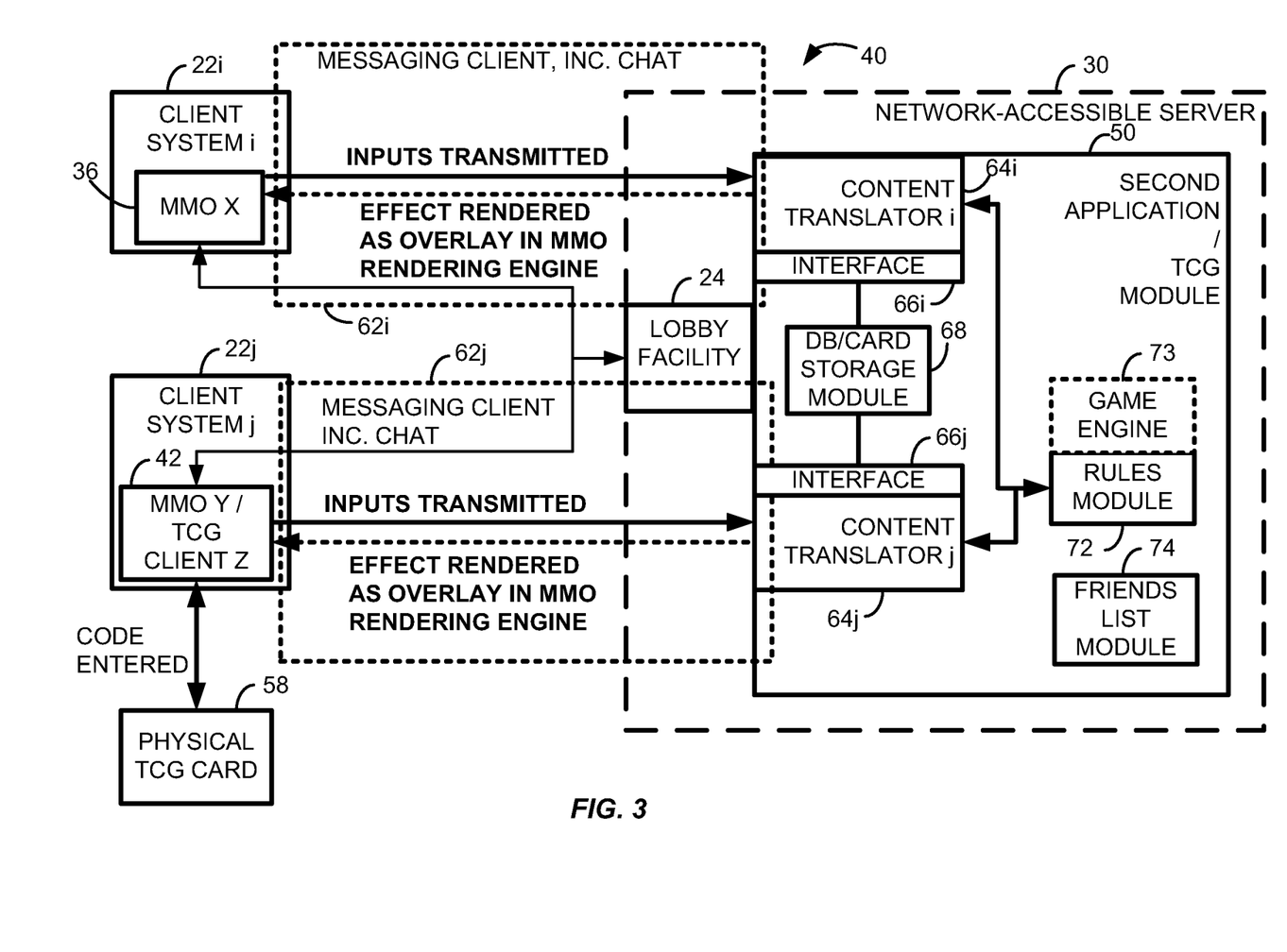
FIG. 3 illustrates a data flow diagram of the system of FIG. 1.

FIG. 3 illustrates one implementation of a system 40 that may be employed for mutual consumption of the second application, as well as its corresponding data flow. In this illustration, a client system 22i runs an MMO (client side) server application 36, while a client system 22j runs an application 42 which may be a client side of MMO Y, an online TCG client, or any other sort of client Z. It is noted that client system 22i may run any of these applications as well.

The system 40 includes a network-accessible server 30. On the server 30 may be stored a lobby facility 24 which is employed to match users of the client systems 22i and 22j for the purpose of consuming the second application. The server 30, lobby facility 24, and client systems 22i and 22j operate and interact in the same way as has been described above with regard to FIGS. 1 and 2.

The network-accessible server may also include a second application module 50, which in the case of a TCG may be termed a TCG module. Components described below pertain to a certain variety of games, including TCGs, but will be understood to be generalizable to other types of content as well. While the second application module 50 is illustrated as being stored on the same network-accessible server as the lobby facility 24, the two may also be stored on different servers.

The TCG module includes other modules in order to allow gameplay. A database module 68 may be used to store and keep track of the cards owned, held, and played by the users. A friends list module 74 may keep and control the display of a list of friends to which any given user is associated. In some cases, a user can determine if any friends are online. A feature may be provided that allows a user to conveniently invite one or more of their friends to play the TCG. A rules module 72, which may operate with or be part of a game engine 73, provides a core gameplay component, including determining the effect of one player's actions on another, enforcing rules, prohibiting illegal card play, and the like. The modules, or portions thereof, may also be stored on one or more other servers, i.e., there is no requirement that all modules be located on a common server.

A content translator 64i is provided for the client system 22i, and a content translator 64j is provided for the client system 22j. If necessary an interface 66i may be provided for content translator 64i and an interface 66j for content translator 64j. These interfaces are shown between the content translators and the database module; however, such interfaces may be provided wherever necessary, including between the content translator and the rules module and/or game engine.

The content translators and interfaces may provide functions such as filtering, abstracting data common to a variety of types of content, and using the abstracted data to determine the results of one player's actions against another. For example, for a TCG, the content translator may retrieve from a played card or cards the data necessary to determine the effect of a player's actions during a turn. Such data may include damage effects, weapon effects, armor effects, magic or spell effects, and the like. This data, thus abstracted from the underlying content, may then be applied against the cards played by the other player. So long as the other player has, e.g., cards with similar data that may be abstracted, the played cards' effects may be determined. After one player's turn, the next player's turn proceeds in the same manner.

In this way, e.g., TCG cards pertaining to a fantasy game may be played against TCG cards pertaining to a space or science fiction game. Moreover, there is not necessarily a requirement that the manufacturer of any given TCG game provide cards that have "equivalent" or abstracted values for armor, damage, weapons, or the like. Rather, following the introduction of a new TCG game, a content translator may be constructed that translates the effects of its cards against any combination of other TCG games, or even against a generic template to which all other TCG cards have been normalized.

As shown in FIG. 3, client systems 22i and 22j may communicate with each other and with other players within the lobby facility 24 via messaging client 62i and 62j, respectively, and the messaging client may also include chat functionality, including voice chat, universal chat, and the like. The messaging clients may not only provide for messaging between players, but for some games, including TCGs, may also provide the primary communications mechanism for transmitting the moves, inputs, or turns each player makes in the game to the second application module 50.

FIG. 3 also illustrates that the results of a first player's gameplay on a second player may be rendered on the second player's client system in a number of ways. In one system, as shown, the effects may be rendered as an overlay using the second player's MMO's (or other such client's) rendering engine. Other ways of displaying gameplay may also be employed, including using a separate window. Where player characters visit a "virtual café" or "virtual room" that is accessible to players from different MMOs or players from different servers within a single MMO, effects may be rendered as if the player characters were sitting at a table across from each other, playing a game. Each user may then view the TCG on the game table, relative to their own vantage point.

FIG. 3 also shows how an offline (physical) TCG may be integrated into an online TCG. A physical TCG card 58 may include a code printed thereon that, when entered into a client system, results in a player receiving a corresponding online TCG card. Alternatively, the player may receive some benefit from the code, e.g., the user's player character may receive a special weapon, attribute, characteristic, ability, pet, mount, or the like. Of course, rather than entering the code, any number of data entry techniques may be employed, including swiping a magnetic strip, scanning an optical code, or the like.

Figure 4:
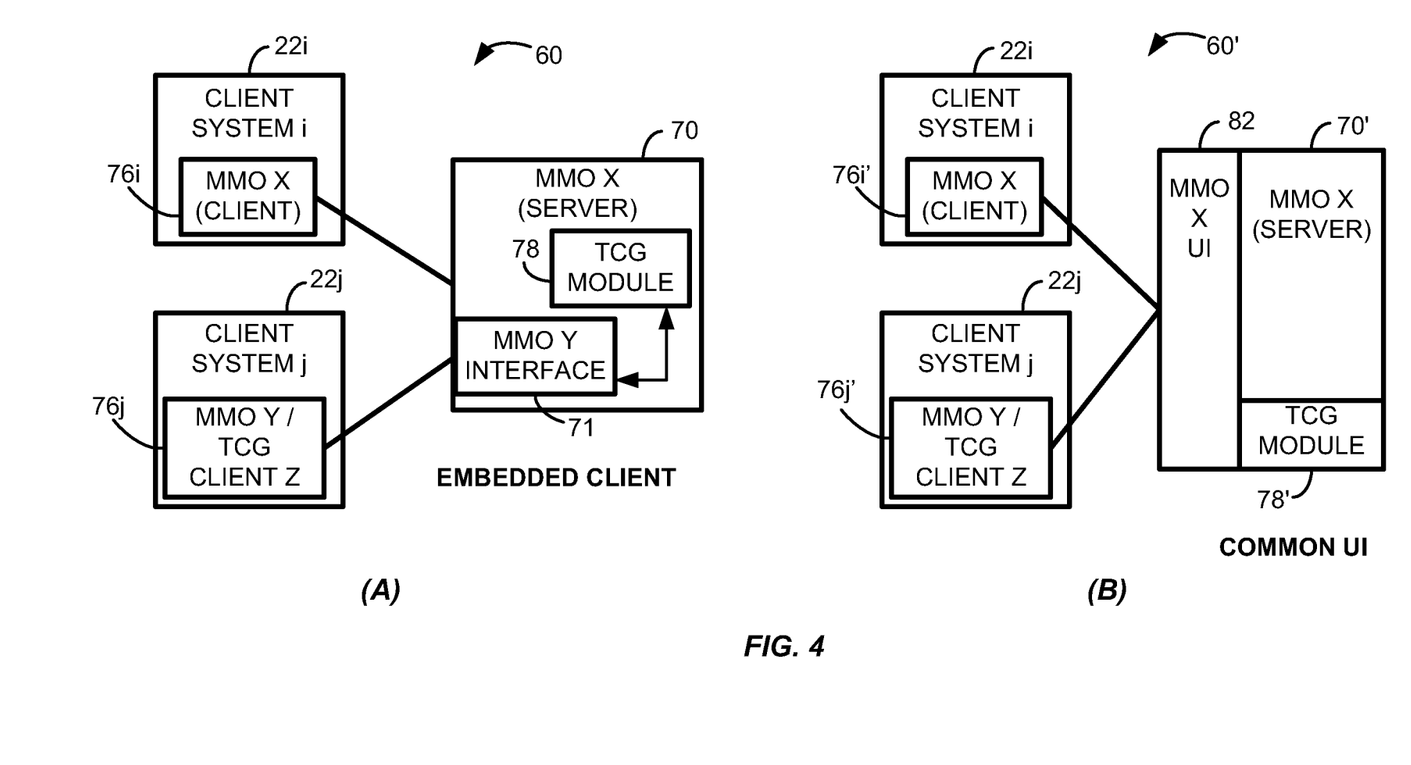

FIGS. 4(A)-(B) illustrate various ways of organizing the TCG software and the MMO software. Referring to FIG. 4(A), the client system 22i runs an MMO client side server application 76i, while a client system 22j runs an application 76j which may be an MMO Y client, an online TCG client, or any other sort of client Z. In the example of FIG. 4(A), the TCG module 78 is embedded within the MMO software 70. The MMO software treats the TCG as part of the MMO and so allows a player of the MMO, having the TCG software installed, to play the TCG in the online environment of the MMO (e.g., at a virtual café or bar in the online environment). As client system 22j runs a first application that is not an MMO X client, an interface 71 is provided (shown as pertaining to MMO Y, but may also pertain to any other second application on client system 22j).

Where the TCG software is not embedded within the MMO, the TCG software and the MMO software may have interfaces so that they can interact and exchange information. Alternatively, the TCG software may be embodied by add-on code that runs along with the MMO software.

FIG. 4(B) shows another way of organizing the TCG software and the MMO software. The client system 22i runs an MMO client side server application 76i', while a client system 22j runs an application 76j' which may be an MMO Y client, an online TCG client, or any other sort of client Z. In FIG. 4(B), the MMO X with server side 70' has a user interface 82. The user interface 82 may also be disposed, in whole or in part, on the client system. A TCG module 78' is separate from the MMO 70'; however, the two share the common user interface 82. In this way, users who are already familiar with the user interface of the MMO may particularly conveniently be introduced to the TCG, as many of the pertinent operations will already be known.

Figure 5:
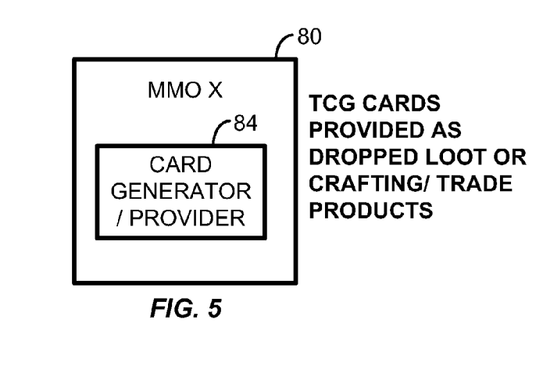
FIG. 5 illustrates a module of an MMO having incorporated a card generator, the card generator providing cards for use in an online TCG.

FIGS. 5-8 provide a further description where the second application is a TCG. In general, because the TCG is integrated within the MMO, at least at a game level if not at a software level, the MMO software may provide in-game features that are related to or which enhance the TCG. Referring to FIG. 5, the MMO X with server side 80 has embedded within a card generator or provider 84 which can construct cards for the TCG.

Figure 6:
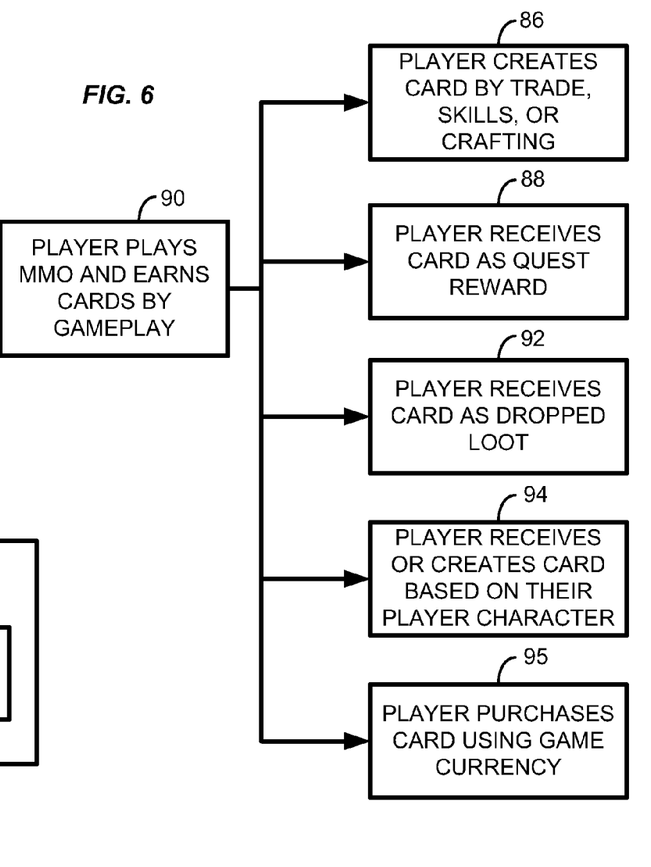
FIG. 6 is a flowchart illustrating ways a player of an MMO may earn cards during gameplay.

The cards may then be provided to players. Referring to FIG. 6, through gameplay (step 90) there may be provided ways for a user to obtain TCG cards. For example, in an MMO where players can create in-game items through in-game skills, e.g., a blacksmith skill allows a player to create equipment such as armor, the MMO can include a skill (step 86) for creating TCG cards. Alternatively, the skill may be a sub-skill of another existing skill. In another implementation, each crafting or trade skill may have a sub-skill associated with the same, the sub-skill corresponding to creating TCG cards pertaining to the main skill.

The MMO may also provide cards for the TCG by allowing players to find TCG cards as "loot" from defeated enemies (step 92) or as rewards for successful accomplishments, e.g., completing quests (step 88), or by allowing players to purchase TCG cards with in-game currency (step 95).

In other implementations, a player may create or obtain a TCG card that is based on the player's own or another player's character, equipment, quests, or events the player's character participated in (step 94). For a card of a player's character, the card could include artwork based on the in-game representation of the character, e.g., the polygonal model.

Figure 7:
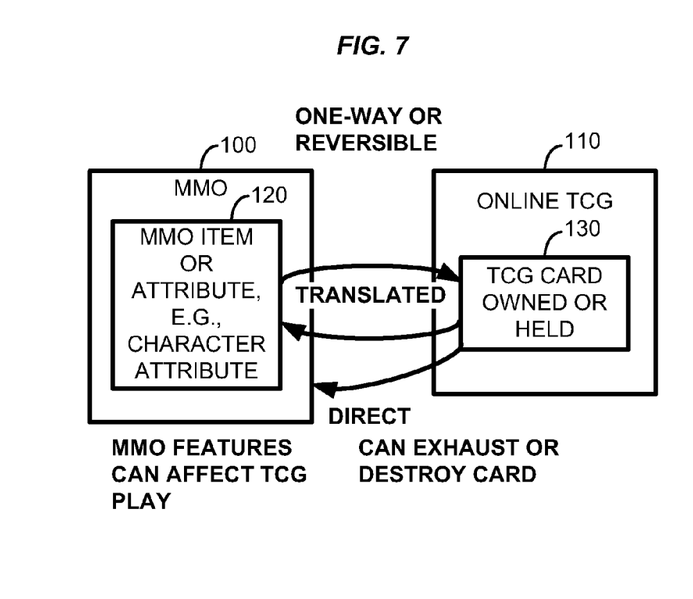
FIG. 7 illustrates a system of an MMO and an online TCG, in which cards may be translated from a use in one to a use in the other. The figure also illustrates direct use of a card from the online TCG in the MMO.

Referring to FIG. 7, an MMO 100 and a TCG 110 may interact in a number of ways. The flowchart of FIG. 6 has indicated how MMO gameplay may provide TCG cards. Conversely, TCG cards may also be used in the MMO, or may be translated for use in the same. In more detail, a TCG card 130 can have functionality in both the MMO 100 and the TCG 110. Besides being used as a card in the TCG 110, the card may also provide some benefit or detriment 120 to a user of the MMO 100 or to a particular character in the MMO 100. For example, holding a particular card may cause a particular character's attack or defense rating or speed to improve. Certain cards may have a similar effect on all characters associated with a given player. In the same way, certain cards may have a group effect on all characters grouped with a given player, all characters in a guild with the given player, and so on.

In an opposite sense, an MMO item or status could have an effect in the TCG 110. For example, a positive reputation or relationship of a character in the MMO 100 with a particular group could have a positive effect in the TCG 110 when using a card related to that same group.

Besides just having an effect, a TCG card 130 can be converted into an MMO item 120. For example, a TCG card 130 of an item of equipment can be converted into the item of equipment 120 in the MMO. The conversion could be made to be one-time or reversible. That is, the reverse could also be available—an item of equipment 120 in the MMO 100 could be converted into a TCG card 130.

Some items can be used directly as items in the other game. For example, a weapon in the MMO 100 can be used as a weapon card in the TCG 110, or vice versa. The use could consume the item or not, depending on design choice. For example, use of a TCG card 130 in the MMO 100 may exhaust or destroy the card.

Many other variations are also possible. For example, the TCG software can be implemented in various ways to provide compatibility with multiple types of MMO software. The TCG software can be a stand-alone application that has a respective interface for each compatible MMO, or that has a common interface used by each compatible MMO. The TCG software can be a module or plug-in that is added or connected to, or embedded within, the MMO software, again having an appropriate interface. The connection between the TCG software and the MMO software can be direct, e.g., on the same computer system, or indirect, e.g., the TCG software is on a mobile device and the MMO software is on a computer system in a local network or on a server system connected through the Internet. While various "connections" are discussed herein, the connection can be read as a configuration allowing communication between the two systems; the communication protocols themselves could be "connectionless", e.g., UDP.

In additional implementations, the TCG software provides tools for interaction between or among players that may not ordinarily be supported by the MMO software. For example, the TCG software may support voice communication, e.g., VoIP, between players, while the MMO software does not support voice communication between MMO players. The TCG software may provide a challenge system to invite other players to play the TCG that is different from the MMO's invitation system. In another example, as noted above, the TCG software may support interaction between players on the same or different servers of the same MMO or players of different MMO's. In one implementation, these inconsistencies are handled by allowing the TCG software to control at least part of the MMO user interface while players are using the TCG.

Figure 8:
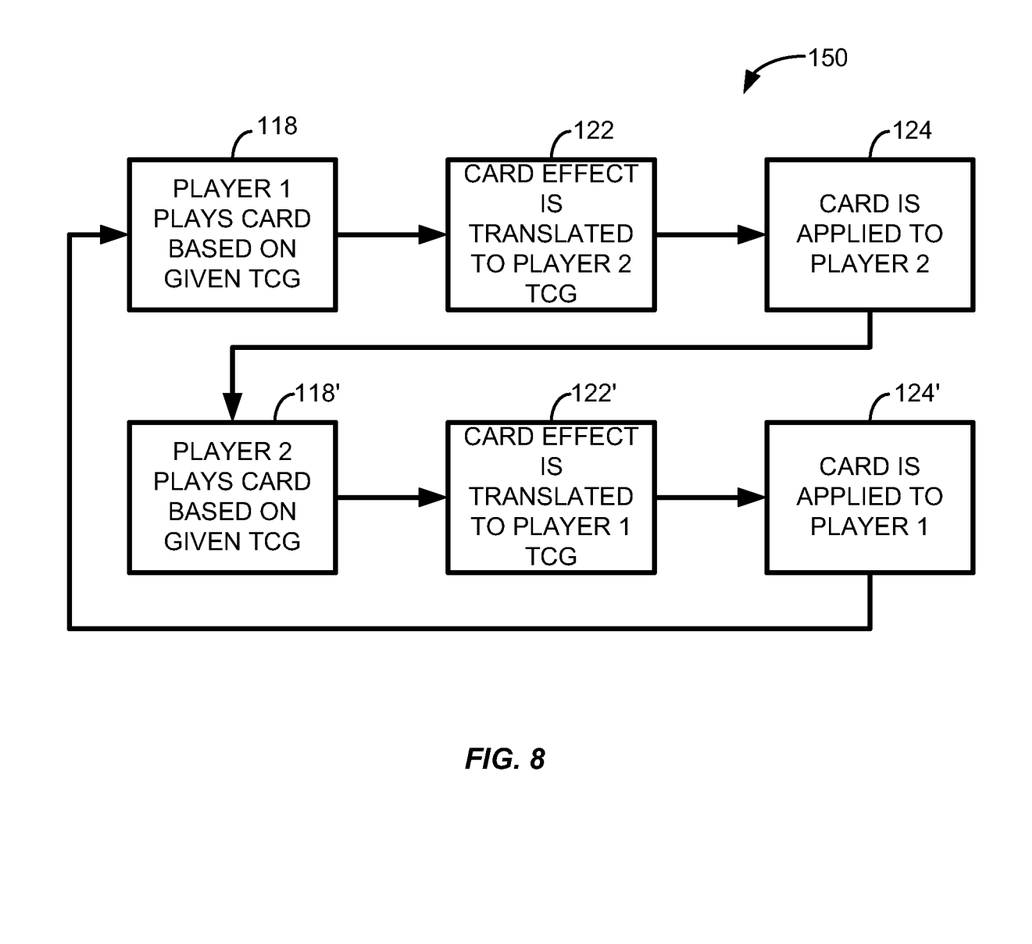
FIG. 8 is a flowchart of a sub-method for mutual consumption of a TCG by client systems, in particular describing the translation of cards from one client system's TCG to another.

FIG. 8 is a flowchart 150 illustrating how cards pertinent to one MMO may be translated to provide an effect in another, e.g., by use of a content translator as described above. A first step is that a first player plays a card, the card having content that pertains to a given TCG.

The card effect may be translated to the TCG used by a second player (step 122). Alternatively, the card effect may be normalized to a generic standard to which all TCGs may be similarly normalized. Such normalization or translation abstracts the data necessary to play one or more cards against another, as described above in connection with the content translators of FIG. 3. The card as translated may then be applied against the cards of the second player (step 124). Similarly, on the second player's turn, the same plays one or more cards based on their given TCG (step 118'). The card effect is translated or normalized (step 122'), and the card or cards are applied against those of the first player (step 124').

Figure 9:
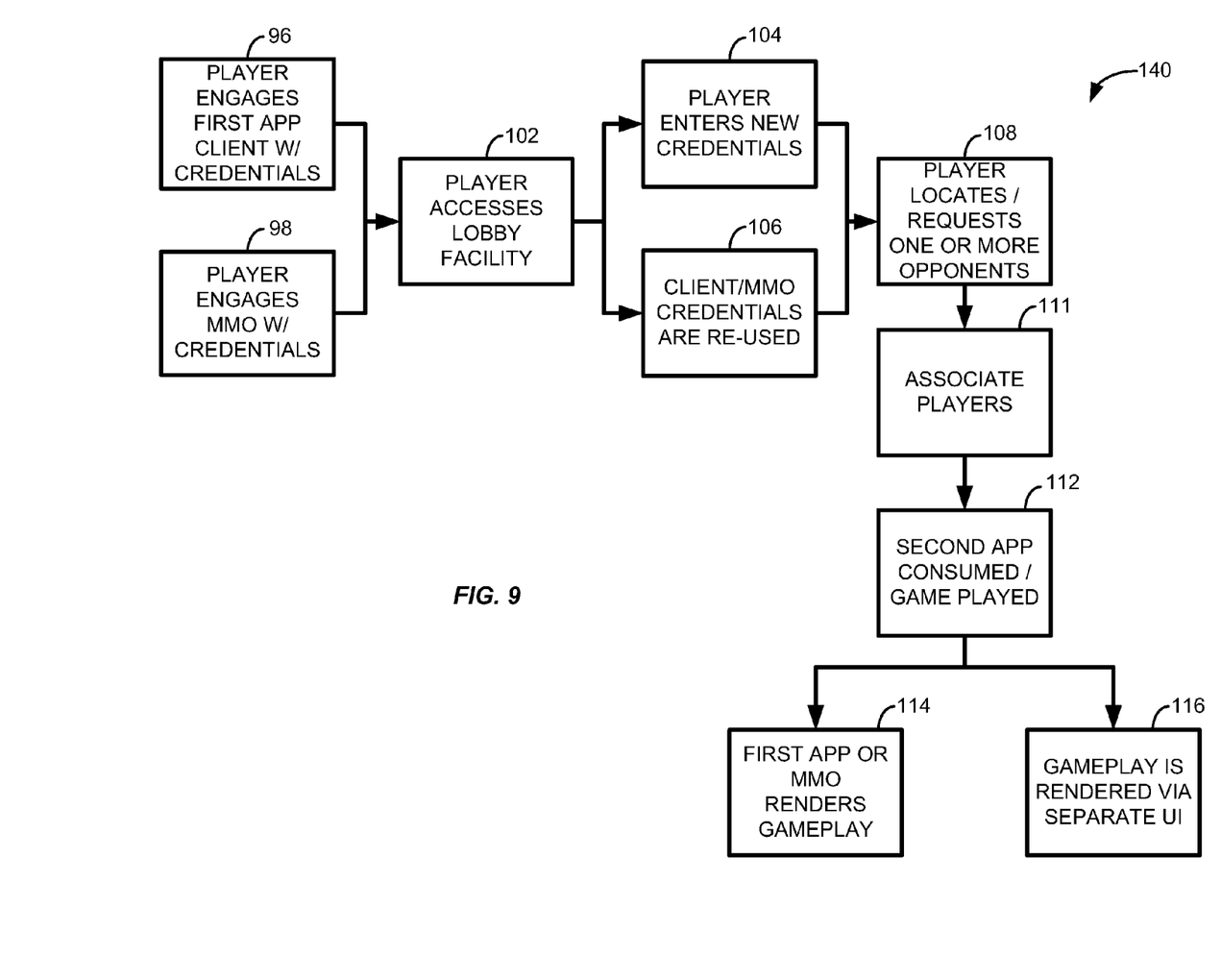
FIG. 9 is a flowchart of a method by which multiple client systems, each running a first application, may access and mutually consume a second application.

FIG. 9 is a flowchart 140 of a method by which multiple client systems, each running a first application, may access and mutually consume a second application. A first step is that a player engages an MMO using appropriate credentials (step 98). Alternatively, a player engages another sort of first application using appropriate credentials (step 96). The first application may be a separate TCG client, a social networking site, or any other sort of client. In some systems, no credentials may be required; however, in most MMO systems, some level of credentialing is generally necessary in order to obtain access to their unique player characters.

After authentication, the player accesses the lobby facility (step 102). To obtain access, the system may be configured to re-use (step 106) the credentials entered when the player logged into the MMO or other first application. Alternatively, new credentials may be entered (step 104).

After obtaining access to the lobby facility, the player may undergo a matching step to find one or more other players with whom to consume content (step 108), e.g., play a TCG. As noted above, the matching may be performed using any number of matching techniques, including employing the geographic location of the users, friends lists, playing level, the content desired to be consumed, the first application each user is running, user input, or any other type of criterion. Two or more players may be matched for play, and in some cases players may be grouped so as to play against other players or against other groups of players. Once a group has been matched, the players are associated (step 111) and an "association" flag 25 may be set (see FIG. 1). Content may then be consumed (step 112), e.g., a TCG game may be played.

Players may view the gameplay by having the same rendered on their display using a rendering engine associated with the first application or the MMO (step 114). Alternatively, the gameplay may be rendered using a separate rendering module (step 116).

As has been described above, systems and methods are provided implementing a way by which multiple client systems, each running a first application, may have integrated therein a second application, the same being accessible and mutually consumable by the multiple clients.

One implementation includes one or more programmable processors and corresponding computer system components to store and execute computer instructions, such as to provide the online version of the first and second applications, e.g., an online environment of an MMO and a TCG. In one implementation, the computer system includes user interface features to allow a user to control the operation of the system and games.

Additional variations and implementations are also possible. For example, players may access their stored TCG deck while playing the MMO, e.g., in order to view and organize their cards. Players may access their stored TCG deck using a TCG client, web application, or other such client. In other variations, while the discussion above focuses on a TCG and MMO, implementations could be developed for other types of games, such as real-time strategy games, card games, board games, video games, etc. In the RTS area, the RTS game may be related to an MMO game that is an RPG. Alternatively, instead of integrating a game into an online environment, a different type of item could be integrated, such as audio or video content. In one example, a user can purchase music that has a corresponding digital data file. When the digital data is introduced to the online environment, it can be accessed within the environment and has effects inside the environment, e.g., characters inside an online game may refer to the music of the data file.

Moreover, while the systems above have been described in the context of two or more players playing against each other, one of the users may actually be a computer opponent or "bot", which is implemented as part of the second application module. Such bots may be available for play, e.g., when other players are unavailable. In addition, implementations may be developed for P2P gaming, rather than through an intermediary server. Accordingly, the scope of the invention is not limited only to the specific examples described above.

The invention claimed is:

1. A non-transitory computer-readable medium comprising instructions for causing a processor in an electronic device to perform a method of, for multiple client systems, each running a different first application within a different respective online environment, accessing other players for mutual consumption of a second application, the method comprising:
   a. providing a lobby facility to which client systems may access;
   b. receiving a login request from a first client system running a first application within an online environment, and authorizing the first client system to access the lobby facility upon verification of a first credential;
   c. receiving a login request from a second client system running a different first application within a different online environment, and authorizing the second client system to access the lobby facility upon verification of a second credential;
   d. following the authorizing of the first and second client systems, associating the first and second client systems, such that the first and second client systems are configured to mutually consume a second application within the lobby facility or launched by the lobby facility.

2. The medium of claim 1, wherein the associating includes receiving a request from the first or second client systems to become associated with the other.

3. The medium of claim 1, wherein the first or second credential is the same as a credential employed to access the first application.

4. The medium of claim 1, wherein the associating further comprises rendering the second application on a user interface of the first application using a rendering engine associated with the first application.

5. The medium of claim 1, wherein a user interface for the second application is the same as the user interface for the first application.

6. The medium of claim 1, wherein the lobby facility is accessible from activating an element within the first application.

7. The medium of claim 6, wherein the lobby facility is a separate web application launched upon activating the element.

8. The medium of claim 1, wherein the second application is audio content, video content, a video game, a podcast, or a combination.

9. The medium of claim 1, wherein the lobby facility includes functionality for universal chat.

10. The medium of claim 9, wherein the universal chat functionality is a communications mechanism for the second joint application.

11. The medium of claim 1, wherein the second application is an online trading card game, in which each of the first and second users are associated with a respective plurality of cards and may hold a subset of the plurality of cards at a given time for gameplay, and wherein the first application within the online environment and the different first application within the different online environment are chosen from the group consisting of a multiplayer game client and an online trading card game client.

12. The medium of claim 11, wherein one or more cards in the online trading card game contains content relevant to a multiplayer game.

13. The medium of claim 12, wherein the associating further comprises translating the effects of cards played by the first user into comparable effects upon the cards of the second user, and vice-versa.

14. The medium of claim 11, wherein:
   a. the first application is a first multiplayer game client within a multiplayer online environment;
   b. the different first application is a second multiplayer game client within a different multiplayer online environment, wherein the second multiplayer game is different from the first multiplayer game; and
   c. the first and second users are associated with, hold, and may play cards with content relevant to the first and second multiplayer games, respectively.

15. The medium of claim 11, further comprising, during gameplay in the multiplayer game, earning cards from the gameplay.

16. The medium of claim 15, wherein the gameplay includes performing crafting or trade skills, or retrieving dropped loot or quest rewards.

17. The medium of claim 11, further comprising altering a user's player character's attribute in the multiplayer game according to a card owned or held by the user.

18. The medium of claim 11, further comprising translating a card into an item in the multiplayer game, or vice-versa.

19. The medium of claim 11, further comprising directly using a card in the multiplayer game.

20. The medium of claim 11, further comprising creating a card based on a user's player character in the multiplayer game.

21. The medium of claim 11, wherein the lobby facility is a virtual location within the multiplayer game.

22. The medium of claim 11, further comprising instructions for causing a processor in an electronic device to perform a method of operating the online trading card game.

23. The medium of claim 22, wherein the method of operating the online trading card game further comprises a method of operating a game engine, a card storage facility, and a friends list.

24. The medium of claim 1, wherein the online environment is a multiplayer game and the different online environment is a different multiplayer game.

25. The medium of claim 1, wherein the online environment is a multiplayer game and the different online environment is an online trading card game client.

26. A non-transitory computer-readable medium comprising instructions for causing a processor in an electronic device to perform a method, for multiple client systems, each running a first application on a different server, of accessing other players for mutual consumption of a second application, comprising:
   a. providing a lobby facility to which client systems may access;
   b. receiving a login request from a first client system running a first application on a first server, and authorizing the first client system to access the lobby facility upon verification of a first credential;
   c. receiving a login request from a second client system running the first application on a second server, and authorizing the second client system to access the lobby facility upon verification of a second credential;
   d. following the authorizing of the first and second client systems, associating the first and second client systems, such that the first and second client systems are configured to mutually consume a second application;
   e. wherein the second application is an online trading card game, in which each of the first and second users are associated with a respective plurality of cards and may hold a subset of the plurality of cards at a given time for gameplay, and wherein the first application is a multiplayer game client;
   f. wherein the online trading card game is configured such that at least two players may play against each other; and
   g. wherein the online trading card game is played within the lobby facility or is launched from the lobby facility.

27. A non-transitory computer-readable medium comprising instructions for causing a processor in an electronic device to perform a method of operating a lobby facility, the lobby facility for matching users, each associated with a client system running a different first application for respective different online environments, for mutual consumption of a second application, comprising:
   a. receiving a login request from a first client system running a first multiplayer game or a first trading card game client within a first online environment, and authorizing the first client to access a lobby facility upon verification of a first credential;
   b. receiving a login request from a second client system running a second multiplayer game or a second trading card game client within a second online environment, the second multiplayer game or trading card game different from the first multiplayer game or trading card game, and authorizing the second client system to access the lobby facility upon verification of a second credential;
   c. following the authorizing of the first and second client systems, matching the first and second client systems such that at least the first and second client systems are configured to mutually play an online trading card game within the lobby facility or launched from the lobby facility.

28. The medium of claim 27, wherein the lobby facility is launched from a lobby button within the first or second multiplayer games or trading card game clients.

29. The medium of claim 27, wherein the lobby facility is launched from or runs within a social networking site.

30. The medium of claim 27, wherein the lobby facility includes a universal chat functionality.

31. The medium of claim 30, where the universal chat functionality is a communications mechanism for the online trading card game.

32. The medium of claim 27, wherein the first online environment is a multiplayer game and the second online environment is a different multiplayer game.

33. the medium of claim 27, wherein the first online environment is a multiplayer game and the second online environment is an online trading card game client.

\* \* \* \* \*